Dec. 24, 1935.     N. B. ORNITZ     2,025,547
INSULATED AND FLUID COOLED SHAFT
Filed July 23, 1931
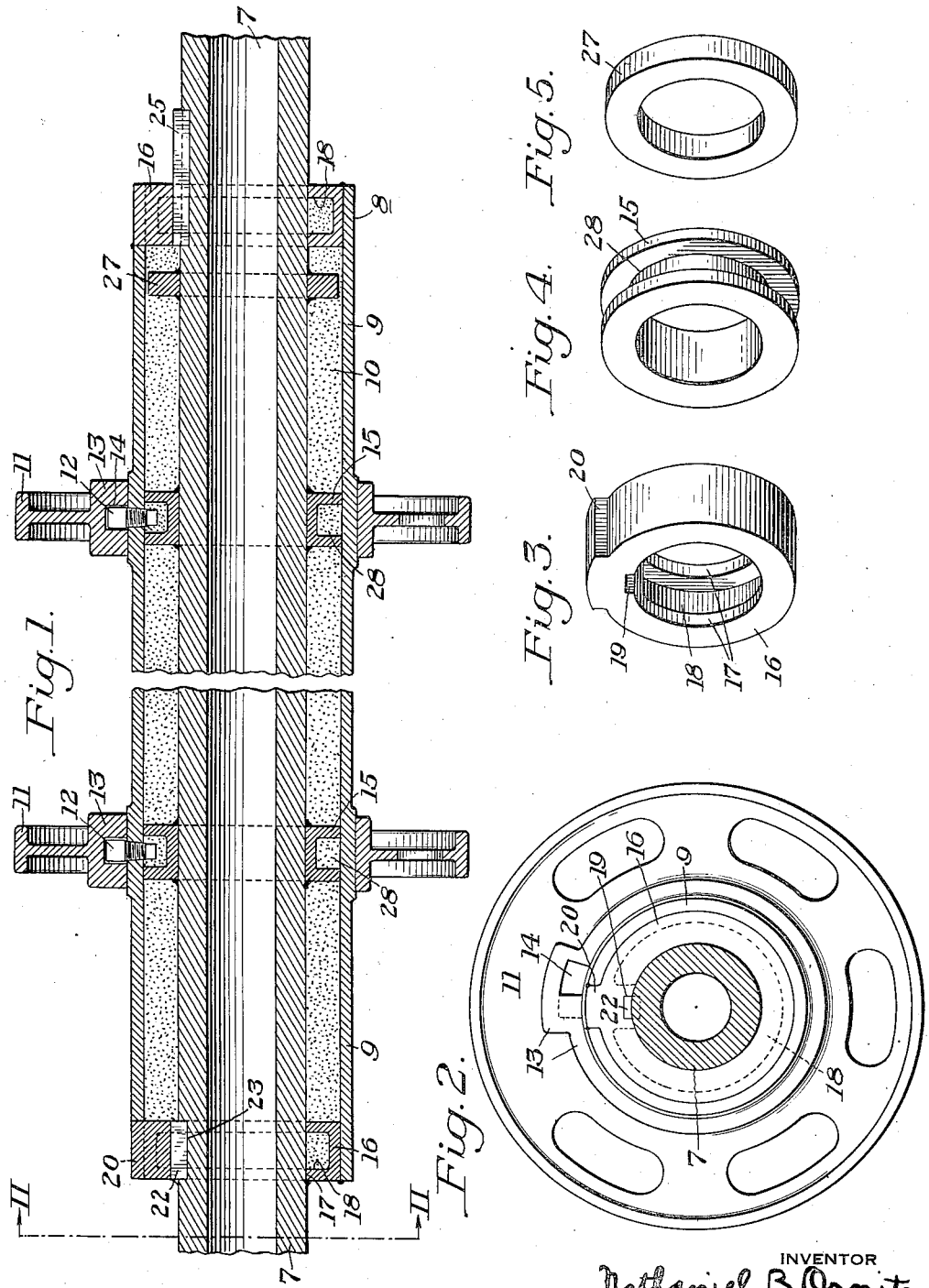
INVENTOR
Nathaniel B. Ornitz
by Byrnes, Stebbing, Parmelee & Blenko
his attorneys Patented Dec. 24, 1935

2,025,547

UNITED STATES PATENT OFFICE 2,025,547

INSULATED AND FLUID COOLED SHAFT

Nathaniel B. Ornitz, Pittsburgh, Pa., assignor to National Alloy Steel Company, Blawnox, Pa., a corporation of Pennsylvania Application July 23, 1931, Serial No. 552,677

15 Claims. (Cl. 263—6)

This invention relates to a novel type of construction of an insulated and fluid-cooled shaft. Fluid-cooled shafts give satisfactory service in many instances since corrosion is materially retarded and there is not the tendency for the shaft to become warped and damaged by the forces due to expansion under heat. It has been proposed to use insulating material in connection with water-cooled shafts because the fuel expense for heating annealing furnaces and the like where water-cooled shafts are employed is increased to a large extent. Shafts have been designed which comprise an inner tube for conducting the cooling water, an outer sleeve, with insulating material between the two. It is clear that the water-cooled tube will expand a much less amount than the outer sleeve which is separated from the tube by insulating material and heated to a high temperature. The difference in expansion thus produced makes it difficult to retain the insulating material between the sleeve and the tube.

The principal object of my invention is to prevent the escape of insulation from between a sleeve and a fluid-conducting member in an insulated and fluid-cooled shaft of the type above referred to.

In the drawing in which, not as limiting my invention, but merely as illustrative of the same, I have shown an insulated water-cooled shaft embodying the principles of my invention, Figure 1 is a view in longitudinal section through an insulated water-cooled shaft having discs secured thereon;

Figure 2 is a transverse vertical section on the line II—II of Figure 1;

Figure 3 is a perspective view of a driving collar which may be keyed to the fluid-conducting member of the shaft;

Figure 4 is a perspective view of a supporting ring which may be mounted on the fluid-conducting member; and Figure 5 is a perspective view of a baffle which may be secured to the fluid-conducting member.

In the type of insulated fluid-cooled shaft which is illustrated in the drawing, an inner metallic member 7 conducts cooling fluid through the shaft 8; an outer sleeve 9 is insulated from the member 7 by insulating material 10, having flow characteristics such as granular or finely divided substances; and rollers such as discs 11 are supported on the sleeve 9. Retaining pins 12 are threaded into the sleeve 9, the ends of the pins 12 projecting both inwardly and outwardly through the sleeve 9. The hub 13 of each disc 11 is provided with a bayonet slot 14, which receives the outwardly projecting end of the pin 12. When assembling the discs 11 on the sleeve 9, the discs slide along the sleeve, the pin 12 entering the slot 14. The disc 11 is then rotated to bring the pin into the other leg of the slot where it securely holds the disc 11 against movement longitudinally of the sleeve 9. A supporting ring 15 is mounted on the member 7 within each disc 11; and the inwardly projecting end of the pin 12 prevents substantial displacement of the ring 15 from beneath the disc 11. The member 7 is, in the embodiment shown, a metallic tube; and the supporting rings 15 may, if preferred, be welded thereto.

Members 16 are provided for preventing relative rotation between the tube 7 and the sleeve 9. If desired, a large number of these members may be employed, but I find that in general two are sufficient. The member 16 is shown in perspective in Figure 3; and it will be noted that it is provided with a central bore 17 and an annular chamber 18. A slot or keyway 19 extends outwardly from the bore 17; and on the periphery of this member is formed a key 20. When the tube 7 and the sleeve 9 are being assembled, a key 22 is inserted in a keyway 23 in the tube 7; and the member 16 is slid into place, the key 22 entering the slot 19. The key 20 which is, it will be noted, integral with the member 16 enters an opening in sleeve 9; and, accordingly, rotation of the sleeve 9 relative to the tube 7 is prevented. If it is desired to assemble the tube 7, the member 16, and the sleeve 9 permanently, the member 16 may be welded to both the tube 7 and the sleeve 9, as shown in Figure 1.

Another member 16 is mounted on the tube 7 at the other end of the sleeve 9. A spline 25 is used at this end of the shaft, however, this spline cooperating with the slot 19 in the member 16 so that when the sleeve 9 expands, the member 16 may move longitudinally of the tube 7 and spline 25. It is preferred, however, to weld the member 16 at this end of the shaft to the sleeve 9.

Within the sleeve 9, and adjacent the end of the insulating material where the splined member 16 permits the endwise movement of the sleeve 9 relative to the tube 7, there is mounted on the tube 7 a baffle 27. In the embodiment shown in the drawing, this baffle 27 is welded to the tube 7, and is arranged closely adjacent the member 16 at the right-hand end of the shaft.

Not only is each member 16 provided with an inner annular chamber 18, but each ring 15 is in like manner provided with an external annular chamber 28. Insulating material of the type specified is placed in the chambers 18 and 28, and in the space between the sleeve 9 and the tube 7. I prefer to use, for this purpose, diatomaceous earth or the like, although other substances such as asbestos may be employed. When the tube 7 and the sleeve 9 are unequally heated, the tube 9 expands a greater amount than the tube 7. Accompanying the lengthening of the sleeve 9 is an endwise expansion of the insulating material, so that substantially the same result is obtained as though the baffle 27 moved inwardly relative to the sleeve 9. This compacts the insulating material so as to prevent its sifting out from the shaft. When the shaft is not in use, the temperature of the sleeve 9 may drop sufficiently so that the baffle 27 moves outwardly again. During use of the shaft, the sleeve 9 will again become heated and the insulating material will again be subject to pressure so as to become packed. The baffle 27, therefore, operates very efficiently to prevent loss of the insulating material out of the shaft. Supporting rings 15 welded to the member 7 also have this compacting effect upon the insulating material. They do not follow the lengthening of the sleeve 9 and the endwise expansion of the insulating material with rising temperatures, but instead are fixed to the member 7. Accordingly, the effect of heating the shaft is to cause the insulating material to become packed between the annular elements fixed or secured to the member 7.

While I have illustrated and described one specific form of insulated water-cooled shaft, it will be understood that the invention is not restricted to the details of the construction shown but may be variously modified within contemplation and under the scope of the following claims:

I claim:

1. An insulated and fluid-cooled shaft comprising a metallic member with a passage therethrough for cooling fluid, a sleeve surrounding said member, insulating material having flow characteristics confined between the member and the sleeve, the sleeve being secured against longitudinal movement relative to said member adjacent one end of the insulating material but not the other, a baffle secured to said member adjacent the other end of the insulating material to retain the latter within the sleeve, and a closure member surrounding said metallic member and carried by the sleeve adjacent said baffle, said closure member being movable longitudinally relative to said metallic member.

2. An insulated and fluid-cooled shaft comprising a tube with a passage therethrough for cooling fluid, a sleeve surrounding said tube, insulating material having flow characteristics confined between the tube and the sleeve, a baffle secured to the tube adjacent one end of the insulating material to retain the latter within the sleeve, the sleeve being free to move longitudinally relative to the tube adjacent the baffle and secured to the tube remotely therefrom, and a closure member surrounding the tube and carried by the sleeve outside said baffle.

3. An insulated and fluid-cooled shaft comprising a tube for conducting cooling fluid, a sleeve surrounding said tube, insulating material having flow characteristics confined between the tube and the sleeve, and closure members retaining the insulating material in the sleeve, one closure member being secured against longitudinal movement relative to both the tube and the sleeve, another being secured against longitudinal movement relative to the tube alone, and a third adjacent the second being secured against longitudinal movement relative to the sleeve alone; whereby expansion of the free end of the sleeve is permitted relative to the tube.

4. An insulated and fluid-cooled shaft comprising a fluid conducting metallic member, a metallic sleeve surrounding said member, insulating material having flow characteristics confined between said member and the sleeve, means enclosing one end of the insulating material and securing the sleeve to said member, a baffle secured to said member adjacent the other end of the insulating material to retain the insulating material within the sleeve, and a closure member surrounding said metallic member and carried by the sleeve outside said baffle, said closure member being movable longitudinally relative to said metallic member.

5. An insulated and fluid-cooled shaft comprising a fluid-conducting tube, a metallic sleeve surrounding the tube, insulating material having flow characteristics confined between the tube and the sleeve, members for preventing relative rotation between the tube and the sleeve, one of said members preventing endwise movement of the sleeve relative to the tube and another being splined, and a baffle adjacent the end of the insulating material where the splined member permits endwise movement of the sleeve relative to the tube, said baffle being adapted to retain the insulating material within the shell.

6. An insulated and fluid-cooled shaft comprising a metallic member with a passage therethrough for cooling fluid, a sleeve surrounding said member, insulating material having flow characteristics confined between the member and the sleeve, the sleeve being secured against longitudinal movement relative to said member adjacent one end of the insulating material but not the other, a baffle secured to said member adjacent the other end of the insulating material, and an annular closure member carried by the sleeve outside said baffle, said closure member being movable longitudinally relative to said metallic member.

7. In an insulated and fluid-cooled shaft comprising a metallic member with a passage therethrough for cooling fluid, a metallic sleeve surrounding and connected to said member to rotate therewith, and insulating material having flow characteristics confined between the member and the sleeve, the improvement consisting of a seal at one end of the sleeve for preventing escape of insulating material, said seal comprising a pair of baffles, one secured against longitudinal movement relative to the sleeve adjacent the end thereof and the other disposed within the sleeve adjacent the first-mentioned baffle and secured against longitudinal movement relative to said member.

8. An insulated and fluid-cooled conveyor shaft comprising a metallic tube for conducting cooling fluid, a sleeve surrounding said tube, insulating material having flow characteristics confined between the tube and the sleeve, said sleeve being integral and free of fissures which would permit the insulating material to sift out, a plurality of rollers carried by the sleeve, and closure members retaining the insulating material in the sleeve, one closure member being secured against longitudinal movement relative to both the tube and the sleeve and another being secured against longitudinal movement relative to the tube alone.

9. An insulated and fluid-cooled conveyor shaft comprising a fluid conducting metallic tube, a continuous metallic sleeve surrounding the tube, a plurality of rollers carried by the sleeve, insulating material having flow characteristics confined between the tube and the sleeve, a plurality of baffles carried by the tube within the sleeve, said baffles being movable with the tube relative to the sleeve upon expansion of the tube longitudinally, and an annular closure member for the sleeve retaining the insulating material at one end thereof, said closure member being secured against longitudinal movement relative to the sleeve.

10. An insulated and fluid-cooled conveyor shaft comprising a hollow metallic one-piece shaft, said shaft being free of fissures which would permit leakage of insulating material having flow characteristics, a cooling fluid tube extending through said shaft, insulating material confined between the tube and the shaft, and closure members for confining the insulating material in the shaft, one closure member being secured against longitudinal movement relative to both the tube and shaft, and another being secured against longitudinal movement relative to the tube alone.

11. An insulated and fluid-cooled shaft comprising a metallic member having a passage therethrough for cooling fluid, a metallic sleeve of one-piece construction surrounding said member, a plurality of rollers mounted on the sleeve, insulating material having flow characteristics confined between the member and the sleeve, means connecting the sleeve and member adjacent one end of the insulating material to prevent longitudinal movement of one relative to the other and to enclose the insulating material at said end, and a baffle secured to said member adjacent the other end of the insulating material to retain the latter within the sleeve.

12. A shaft of the type described, comprising a metal tube, a sleeve surrounding the tube, insulating material having flow characteristics confined between the sleeve and tube, and spaced means secured to the tube for compacting the insulating material as said material becomes heated and expands.

13. A shaft of the type described, comprising a metal tube, a metal sleeve surrounding the tube, insulating material having flow characteristics between the sleeve and tube, said sleeve being integral and free from fissures which would permit the insulating material to sift out, and spaced annular elements secured to the tube for compacting the insulating material as said material becomes heated and expands.

14. A furnace roll, comprising a metal tube for conducting cooling fluid, a sleeve surrounding said tube, insulating material having flow characteristics between the sleeve and tube, said sleeve being integral and free from fissures which would permit leakage of insulating material, a plurality of work supporting discs carried by the sleeve, and spaced means secured to the tube for compacting the insulating material as said material becomes heated and expands.

15. A furnace roll, comprising a metal tube for conducting cooling fluid, a metal sleeve surrounding said tube and fixed thereto adjacent one end and free to move longitudinally relative thereto at the other end, insulating material having flow characteristics between the sleeve and tube, said sleeve being integral and free of fissures which would permit leakage of insulating material, a plurality of work supporting discs carried by the sleeve, and spaced annular elements secured to the tube for compacting the insulating material as said material becomes heated and expands.

NATHANIEL B. ORNITZ.